(12) United States Patent
Meng et al.

(10) Patent No.: US 8,301,576 B2
(45) Date of Patent: Oct. 30, 2012

(54) WEIGHTED PATTERN LEARNING FOR NEURAL NETWORKS

(75) Inventors: Zhuo Meng, Broadview Heights, OH (US); Baofu Duan, Cleveland Heights, OH (US); Yoh-Han Pao, Cleveland Heights, OH (US); Ronald J. Cass, Cleveland Heights, OH (US)

(73) Assignee: CA, Inc., Islandia, NY (US)

( * ) Notice: Subject to any disclaimer, the term of this patent is extended or adjusted under 35 U.S.C. 154(b) by 1177 days.

(21) Appl. No.: 11/261,277

(22) Filed: Oct. 27, 2005

(65) Prior Publication Data

US 2007/0112707 A1    May 17, 2007

(51) Int. Cl.
*G06N 5/00* (2006.01)
(52) U.S. Cl. ............................................. 706/25; 706/45
(58) Field of Classification Search .................... 706/25, 706/16, 45, 47; 62/192
See application file for complete search history.

(56) References Cited

U.S. PATENT DOCUMENTS

| | | | | |
|---|---|---|---|---|
| 5,720,002 | A * | 2/1998 | Wang ............................... | 706/25 |
| 6,907,412 | B2 * | 6/2005 | Pao et al. ......................... | 706/16 |
| 7,059,143 | B1 * | 6/2006 | Zugibe et al. ................... | 62/192 |
| 7,092,922 | B2 * | 8/2006 | Meng et al. ...................... | 706/16 |
| 2005/0033709 | A1 | 2/2005 | Meng et al. ...................... | 706/25 |

FOREIGN PATENT DOCUMENTS

| | | |
|---|---|---|
| WO | WO 89/09449 | 5/1989 |
| WO | WO 2004/107264 | 12/2004 |

OTHER PUBLICATIONS

Holland, P.H. and Welsch, R.E., "Robust Regression Using Iteratively Reweighted Least Squares", Communications in Statistics: Theory and Methods, vol. 6, pp. 813-827, 1977.
Notification of Transmittal of the International Search Report and the Written Opinion of the International Searching Authority, or the Declaration for PCT/US 06/041509 (ISA/EP); 12 pages, Feb. 18, 2008.
Baofu Duan and Yoh-Han Pao; "Iterative Feature Weighting for Identification of Relevant Features with Radial Basis Function Networks;" IEEE, International Joint Conference on Neural Networks—Montreal; pp. 1063-1068, Jul. 31, 2005.
Er-Wei Bai and Krishnan M. Nagpal;"Least Squares Type Algorithms for Identification in the Presence of Modeling Uncertainty," IEEE, 33rd Conference on Decision and Control—Lake Buena Vista, FL; pp. 3602-3607, Dec. 1994.

* cited by examiner

*Primary Examiner* — Wilbert L Starks
(74) *Attorney, Agent, or Firm* — Baker Botts L.L.P.

(57) ABSTRACT

A method of training a neural net includes receiving a plurality of sets of data, each set representative of a plurality of inputs to the neural net and a resulting at least one output from the neural net and calculating a plurality of network weights for the neural network based on the received plurality of sets of data. Calculating the plurality of network weights including attributing greater weight in the calculation to at least one set of the plurality of sets of data than at least one other set of the plurality of sets of data.

12 Claims, 3 Drawing Sheets

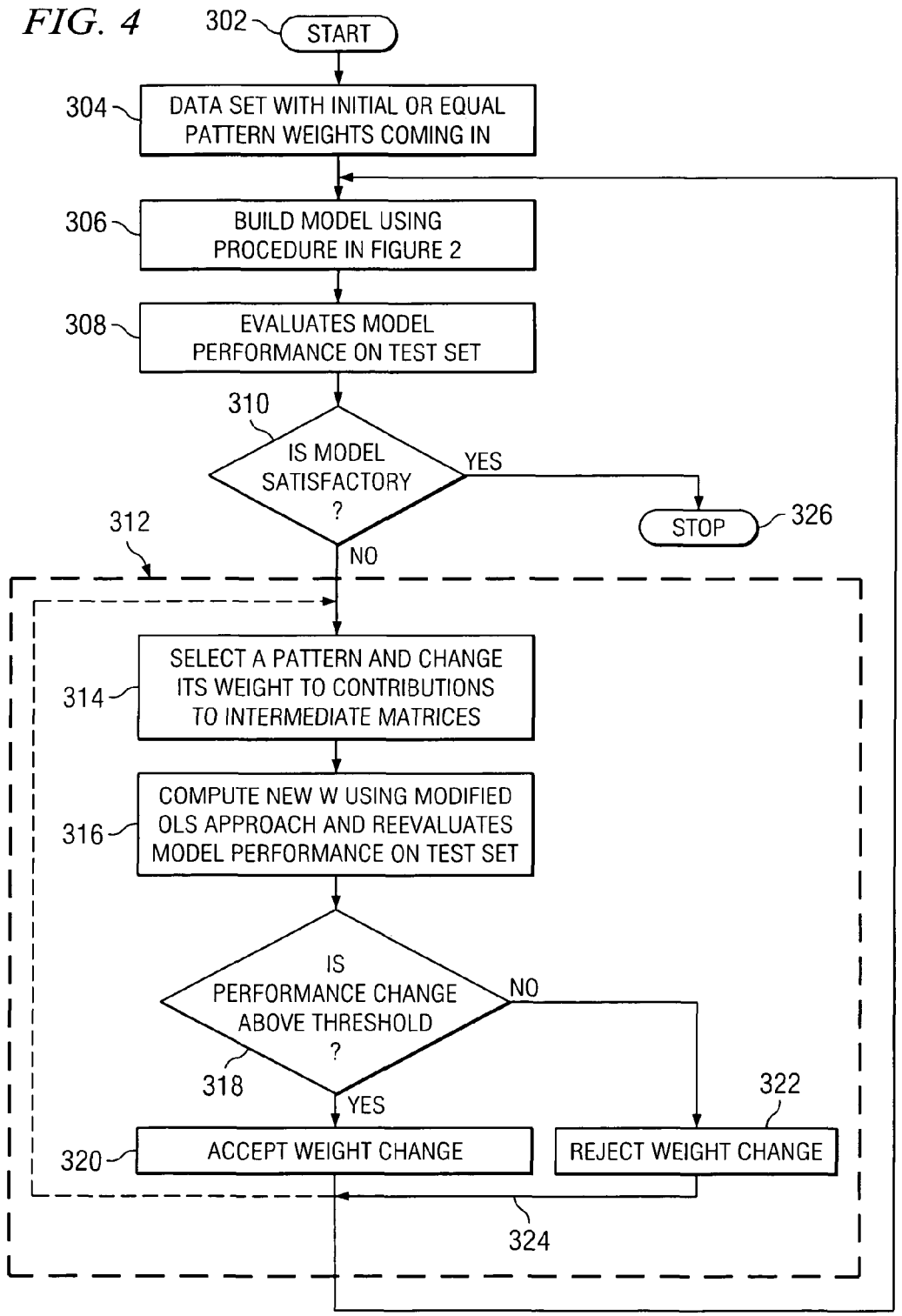

US 8,301,576 B2

WEIGHTED PATTERN LEARNING FOR NEURAL NETWORKS

TECHNICAL FIELD OF THE INVENTION

This invention relates generally to creating neural networks and more particularly to a weighted pattern learning for neural networks.

BACKGROUND OF THE INVENTION

Neural net modeling has gradually become a preferred approach in building a mathematical model of a system, especially when the dynamics of the system are unfamiliar to the model builder. This is due at least in part to its capability of achieving universal approximation. Being a mathematical model of a system, a neural net should be representative of the dynamics of the system. Because a neural net model is created from a set of training data representing the system dynamics, the power of representation the model has for representing the system cannot be better than that embedded in that set of training data. However, the reliability, or other characteristics affecting the quality of the resulting model, of each pattern in a data set may not be the same due to various reasons, such as equipment constraints or uneven distribution of data points.

SUMMARY OF THE INVENTION

A method of training a neural net includes receiving a plurality of sets of data, each set representative of a plurality of inputs to the neural net and a resulting at least one output from the neural net, and calculating a plurality of network weights for the neural network based on the received plurality of sets of data. Calculating the plurality of network weights including attributing greater weight in the calculation to at least one set of the plurality of sets of data than at least one other set of the plurality of sets of data.

Certain embodiments of the invention may provide numerous technical advantages. Some embodiments may benefit from some, none, or all of these advantages. According to one embodiment of the invention, a method and system are provided that allow creation of a neural net that more accurately approximates a physical system by weighting certain pattern data that is more reliable or more accurate with greater significance than other pattern data that is less reliable or accurate.

Other technical advantages will be readily apparent to those of skill in the art.

BRIEF DESCRIPTION OF THE DRAWINGS

A more complete understanding of embodiments of the invention will be apparent from the detailed description taken in conjunction with the accompanying drawings in which:

FIG. 4 is a flowchart illustrating a method for automatic pattern weight adjustment according to one embodiment of the teachings of the invention.

DETAILED DESCRIPTION OF THE INVENTION

Figure 1A:
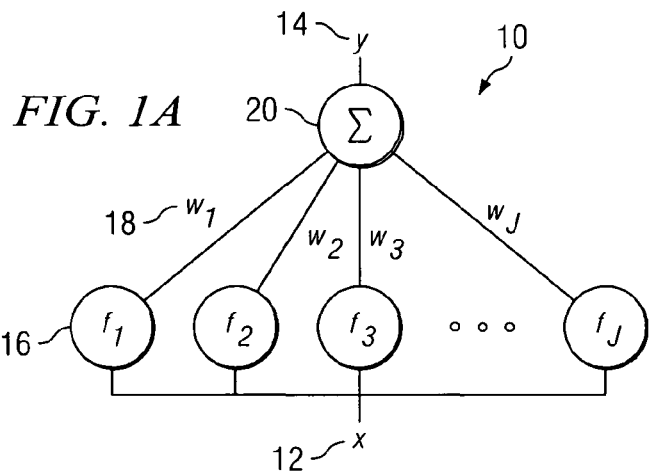
FIG. 1A is a schematic diagram illustrating a neural net 10 that may be trained according to the teachings of the invention.

Certain embodiments of the invention involve the use of weights for individual patterns used to train a neural network so as to take pattern reliability into account by weighting patterns with better reliability higher. This is accomplished in some embodiments by weighting the contribution to certain intermediate matrices associated with a set of simultaneous equations representative of the inputs and outputs of the neural net. This approach is particularly applicable to the learning of functional-link nets using the least squares training method and can be used both in generation of a new model or in adaptive maintenance of an existing model.

According to one embodiment in which a model is built, in addition to the use of available weights from a priori knowledge, estimation of the importance of each training pattern is accommodated. That can be achieved by using an external weight adjustment algorithm such as boosting. Boosting refers to a learning methodology for improving the accuracy of any learning algorithms which is described in R. E. Schapire, "The Boosting Approach to Machine Learning: An Overview," *MSRI Workshop on Nonlinear Estimation and Classification,* 2002, R. E. Schapire, "The strength of weak learnability", *Machine Learning,* vol. 5(2), pp. 197-227, 1990, and Y. Freund, "Boosting a weak learning algorithm by majority," *Information and Computation,* vol. 121(2), pp. 256-285, 1995, which are incorporated herein by reference. Alternatively, this may be achieved by simply adjusting its weight and taking note of the effects that are introduced on an independent set of test patterns. This is possible in some embodiments because this approach allows for efficient weight adjustment of a single pattern at a time. Weights can then be refined for the training patterns accordingly. By carrying out this procedure iteratively, the performance of the model can be improved automatically.

Another example situation where weighted pattern learning might be desired is to incorporate hints. Hints may be from general past experience and/or from first principles. Each pattern can be checked for consistency with hints and weighted accordingly. A third example is to emphasize the hard-to-learn patterns over those easy-to-learn patterns.

The weighted pattern learning of some embodiments allows one to weigh each pattern differently to take into account the role the pattern plays in building the model to optimize the performance of resulting model with the same training data. This weighting applies particularly well to a functional-link net structure with modified orthogonal least squares ("OLS") algorithm learning. In some embodiments this approach requires storage amounts that are dependent only on the size of the model, not on the number of patterns in training data set. In certain embodiments, when pattern level weights are known ahead of learning, only one pass of data is needed and can be carried out with as few as one new pattern.

As described by example below, the teachings of the invention recognize a manner to address the problem that neural net training could not directly utilize pattern weights due to its inherent non-linearity. Although direct weighting of an original pattern in neural net learning is not yet performed in general, the teachings of the invention allow pattern-level weights to be utilized in the learning of neural nets using, in some embodiments, a least squares training method by not weighting the original pattern but by weighting the contribution to intermediate matrices, which are used in the least squares training method from each pattern.

An example derivation is presented below for the functional-link net architecture as shown in FIG. 1A. FIG. 1A is a schematic diagram illustrating a neural net 10 that may be trained according to the teachings of the invention. Net 10 can be used to approximate any scalar function with a vector 12 of inputs, x, and a scalar output 14, y. As illustrated, network 10 receives a vector 12 of inputs and applies a plurality of respective functions 16 to each input in association with a plurality of weights 18. The resulting products of weights 16 and functions 18 are summed by a summer 20 to result in output 14, y. Because a vector function can be decomposed into scalar dimensions, and thus can be approximated with multiple output nodes or multiple nets, the use of single output node in this example will not cause loss of generality, and more than one output node could be used.

The task is to create or to improve a model to approximate the following scalar function:

$$y = y(x) \quad (1)$$

using the functional-link network illustrated in FIG. 1, in which the function is approximated by the linear sum of a set of non-linear basis functions, $f_j(x)$, where $j=1, \ldots, J$. This approximated representation can be written as:

$$\hat{y}(x) = \Sigma w_j f_j(x) \quad (2)$$

Although radial basis functions such as Gaussians are frequently selected as $f_j(x)$ in Equation (2), other functions, such as sigmoids or wavelets, can also be used.

Because the basis functions are usually determined separately by a priori knowledge or through unsupervised learning, the only variables in Equation (2) are the network weights, $w_j$, which are determined by fitting a given set of associated pattern pairs $\{(x_p, y_p)\}$ where $p=1, \ldots, P$. Since Equation (2) is non-linear, direct weighting of an original pattern is not practical. That is, if one were to use pattern pairs $\{(u_p x_p, u_p y_p)\}$ instead of $\{(x_p, y_p)\}$, where $u_p$ is the pattern weight, to solve for the network weights $w_j$ in Equation (2), the solution is not a model of the original function in Equation (1).

Given a training set of P patterns, determining the network weights, $w_j$, in Equation (2) actually means solving, in least-squares sense, a system of P simultaneous equations, which can be written in matrix form as $$\begin{bmatrix} y_1 \\ y_2 \\ \vdots \\ y_P \end{bmatrix} = y = Fw = \begin{bmatrix} F_1 \\ F_2 \\ \vdots \\ F_P \end{bmatrix} w = \begin{bmatrix} f_1(x_1) & f_2(x_1) & \cdots & f_J(x_1) \\ f_1(x_2) & f_2(x_2) & \cdots & f_J(x_2) \\ \vdots & \vdots & \ddots & \vdots \\ f_1(x_P) & f_2(x_P) & \cdots & f_J(x_P) \end{bmatrix} w \quad (3)$$

where the F matrix would contain the outputs of the functional-links nodes for the P patterns and of size P×J. The outputs, y, a P×1 matrix would contain the predicted values by the model for the P patterns. The weights of the net, w, a J×1 matrix for single output, would be the least-squares solution of Equation (3), which can be obtained by solving the following system of linear equations:

$$F^T y = F^T F w \quad (4)$$

where the elements of intermediate matrices $F^T y$ and $F^T F$ can be computed using their component forms:

$$[F^T y]_j = \sum_{p=1}^{P} f_j(x_p) y_p, \text{ where } j = 1, \ldots, J \quad (5)$$

and $$[F^T F]_{ij} = \sum_{p=1}^{P} f_i(x_p) f_j(x_p), \text{ where both } i \text{ and } j = 1, \ldots, J \quad (6)$$

However, if one were to simply solve Equation (4) or an orthogonalized equivalent of it when using orthogonal least squares approach, which offers better numerical stability, the obtained weights for the net would be based on equal contribution of all patterns in the training set.

To introduce pattern level weight in the learning process, consider individual equations in the system of linear equations represented by Equation (3), $$y_p = F_p w, \text{ where } p = 1, \ldots, P. \quad (7)$$

Because a constant multiplied on both sides of an equation theoretically will not change its solution, Equation (5) is equivalent to $$u_p y_p = u_p F_p w, \text{ where } p = 1, \ldots, P. \quad (8)$$

However, since w is the least squares solution for the system of equations, the values of w derived from Equations (7) and (8) will be different in general, since the error to minimize is $$e = \sum_p (y_p - F_p w)^2 \quad (9)$$

and $$e = \sum_p [u_p (y_p - F_p w)]^2 \quad (10)$$

for those two cases respectively. It can be seen from Equation (10) that, with Equation (8), the least squares process will tend to minimize errors more for patterns with higher $u_p$ values, which in other words, weight patterns with higher $u_p$ values higher in the learning process.

Substituting $u_p F_p$ for $F_p$ and $u_p y_p$ for $y_p$ in Equation (3), yields $$\begin{bmatrix} u_1 y_1 \\ u_2 y_2 \\ \vdots \\ u_P y_P \end{bmatrix} = \quad (11)$$

$$y_u = F_u w = \begin{bmatrix} u_1 F_1 \\ u_2 F_2 \\ \vdots \\ u_P F_P \end{bmatrix} w = \begin{bmatrix} u_1 f_1(x_1) & u_1 f_2(x_1) & \cdots & u_1 f_J(x_1) \\ u_2 f_1(x_2) & u_2 f_2(x_2) & \cdots & u_2 f_J(x_2) \\ \vdots & \vdots & \ddots & \vdots \\ u_P f_1(x_P) & u_P f_2(x_P) & \cdots & u_P f_J(x_P) \end{bmatrix} w$$

Corresponding to Equation (4), for the set of equations represented by Equation (11), the least squares solution is obtained by solving the following system of linear equations, $$\sum_{p} u_p^2 F_p^T y_p = F_u^T y_u = F_u^T F_u w = \left( \sum_{p} u_p^2 F_p^T F_p \right) w \quad (12)$$

And the intermediate matrices $[F_u{}^T y_u]_j$ and $[F_u{}^T F_u]_{ij}$ in Equations (5) and (6) become, $$[F_u^T y_u]_j = \sum_{p=1}^{P} u_p^2 f_j(x_p) y_p, \text{ where } j = 1, \dots, J \quad (13)$$

and $$[F_u^T F_u]_{ij} = \sum_{p=1}^{P} u_p^2 f_i(x_p) f_j(x_p), \quad (14)$$

where both $i$ and $j = 1, \dots, J$

From Equations (12)-(14), it can be seen that the pattern level weights modify the contribution to the intermediate matrices $F^T y$ and $F^T F$ in Equation (4). As in the case of Equation (4), one can use the modified orthogonal least squares approach to solve for Equation (12). Thus this pattern-level weighted learning approach naturally integrates to the streaming adaptive least-squares learning and enhances the overall performance of model generation and maintenance.

Figure 1B:
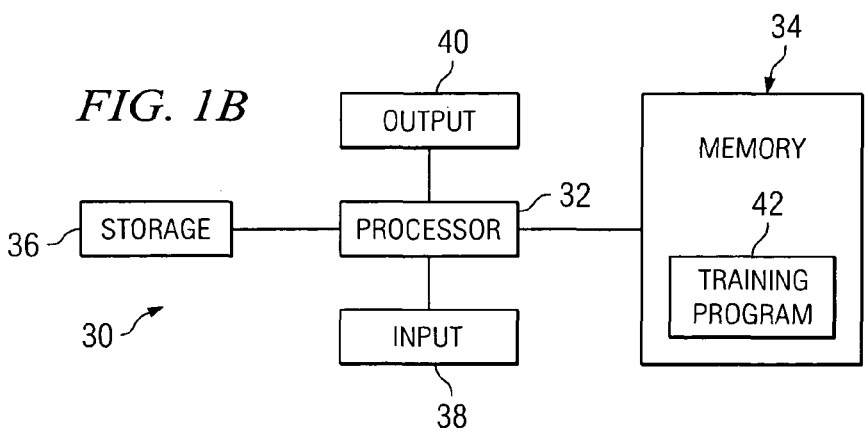
FIG. 1B is a block diagram illustrating a computer system 30 according to one embodiment of the invention.

FIG. 1B is a block diagram illustrating a computer system 30 according to one embodiment of the invention. It should be emphasized that computer system 30 is merely provided as one example implementation. According to one embodiment, neural net 10 is trained by computer system 30.

Computer system 30 comprises, in this example, processor 32. Associated with processor 32 is memory 34 and storage 36. Memory 34, in this example, is random access memory; however, other types of memory may be utilized. In general, memory 34 is utilized to store a computer program such as training program 42 illustrated in FIG. 1B, operable to execute certain instructions associated with training neural net 10 according to the teachings of the invention. Alternatively, such a program may be stored and executed from storage 36. Storage 36 may include other types of memory other than random access memory such as read only memory and may be embodied in hard disks, CD-ROMs, DVD, or other mass storage devices. Input 38 is an input mechanism of computer system 30 which may include a keyboard, a mouse, and other suitable input devices, including I/O apparatus for communicating directly with other computers. Output 40 may be a printer, a display, or other suitable output device for computer 30, including I/O apparatus for communicating directly with other computers.

Figure 2:
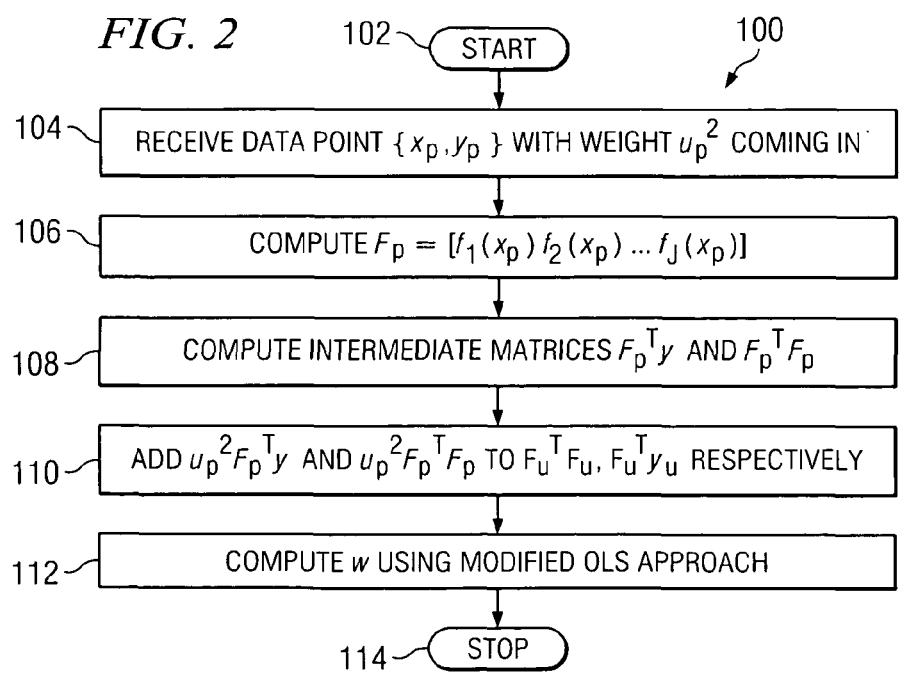
FIG. 2 is a flowchart illustrating example steps associated with a method for training a neural net according to one embodiment of the invention.

FIG. 2 is a flowchart illustrating example steps associated with a method for training a neural net according to one embodiment of the invention. Some or all of the below-described acts may be executed by training program 42 illustrated in FIG. 1B; however, other suitable devices may be used to implement these acts. Equations (12)-(14) show that one can incorporate pattern-level weights in learning of functional-link nets using a least squares method. Determination of the pattern-level weights, which are treated as constants determined ahead of the least squares solution, is described below.

For certain problems, weights may come from a priori knowledge of the patterns in the data set, such as reliability of each pattern from known characteristics of the measuring equipment. For example, the uncertainty of measured values may be higher in fringe areas or when the signal level is low. In this case, weights can be set to be commensurate with the reliability values. Equations (12)-(14) can be directly applied for these problems using the steps illustrated in the flow chart shown in FIG. 2. Because the intermediate matrices defined in Equations (13) and (14) are linear sums of contributions from each pattern, the effect of one pattern on the model can be adjusted by simply changing its weight to the contributions to the intermediate matrices and carrying out the modified OLS approach to find the new set of network weights and test the new model against a separate test set to note if the prediction is improved or not. Thus, one can start with equal pattern weights, or start with a set of pattern weights determined through a priori knowledge, and then adjust the weight of a pattern based on its effect on the prediction capability of the model.

The method begins at step 102. At step 104 data corresponding to the input vector 12 and output 14 are received with associated pattern weights. At step 106 the matrix F of Equation (12) is calculated for a pattern received at step 104. At step 108 the intermediate matrices defined by Equations (13) and (14) are calculated. At step the intermediate matrices are summed in association with the pattern weights according to Equation (12). At step 112 the Equation (12) is solved for the network weights w using, in this example, an orthogonal least squares approach. The method concludes at step 114.

Figure 3:
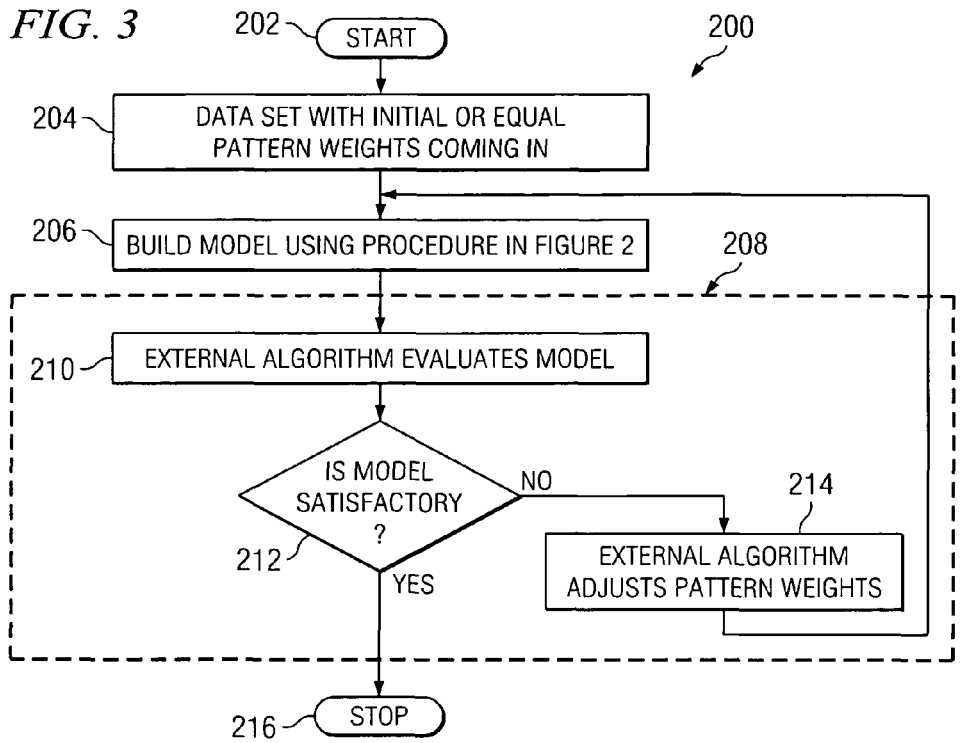
FIG. 3 illustrates a flowchart illustrating the use of an external algorithm for calculating pattern weights that is used in conjunction with a method for calculating network weights according to one embodiment of the invention.

The pattern weights, $u_p$, can also be determined automatically by iterative refinement. An external algorithm can be used to drive the iterative refinement of pattern weights. One example is to use boosting, described above, together with the approach of FIG. 2 for classification models. Because boosting can directly utilize pattern weights as a much simpler alternative to changing distribution of samples, this method is more efficient and likely more accurate than the alternative. More specific examples of the boosting method have been illustrated by Holland, P. H. and Welsch, R. E., "Robust Regression Using Iteratively Reweighted Least Squares", Communications in *Statistics: Theory and Methods*, Vol. 6, 1977, pp. 813-827. This type of usage is illustrated in FIG. 3. In FIG. 3, functions inside the box with dashed lines are those of the external algorithm.

FIG. 3 illustrates a flowchart illustrating the use of an external algorithm for calculating pattern weights that is used in conjunction with a method for calculating network weights according to one embodiment of the invention. The method begins at step 202. At step 204 a data set including input 12 and output 14 with initial or equal pattern weights is received. At step 206, a neural net model is constructed, for example, according to method 100 of FIG. 2. At step 208, which may be performed by an algorithm external to training program 42, or training program 42, the pattern weights are calculated. This includes at step 210 the evaluation of the desirability of the model constructed at step 206 using the initial or equal pattern weights received at step 204. At step 212 a decision is made as to whether the model is satisfactory. If the model is not satisfactory the pattern weights are adjusted at step 214 and processing continues again at step 206. However, if the model is satisfactory, the method concludes at step 216. This process 200 can be carried out iteratively until satisfaction or until no significant improvements can be achieved to achieve automatic enhancement of learning. This type of usage is illustrated in FIG. 4.

FIG. 4 is a flowchart illustrating a method for automatic pattern weight adjustment according to one embodiment of the teachings of the invention. In FIG. 4, the operations inside the dashed box 312 may be carried out for each pattern in a loop by following the dashed arrow. The weight adjustment for each pattern can either be dependent on previous changes, i.e. previous changes take effect immediately, or independent of previous changes by keeping the new pattern weights but do not apply them until weight adjustment has been carried out for all patterns.

The method begins at step 302. At step 304 a dataset with initial or equal pattern weights is received. At step 306 a model of the neural net 10 is constructed using process 100 illustrated in FIG. 2. At step 308 the model performance is evaluated based upon a test set of data. If the model is determined to be satisfactory at step 310, the process concludes at step 326. However, if the model is not satisfactory then adjustments to the pattern weights are made as illustrated in block 312. In particular, at step 314 a pattern is selected and the weights are changed to the contributions from intermediate matrices. At step 316 new network weights using a modified orthogonal least squares approach described above is utilized and a model for performance is reevaluated on the test set. At step 318 it is determined whether the performance change that occurred as a result of using the new pattern weights is above a threshold. If so, then the changes are accepted at step 320 and processing continues back again at step 306. However, if the performance change is not above a threshold the new weight changes are rejected and processing again continues at step 306.

Figure 5:
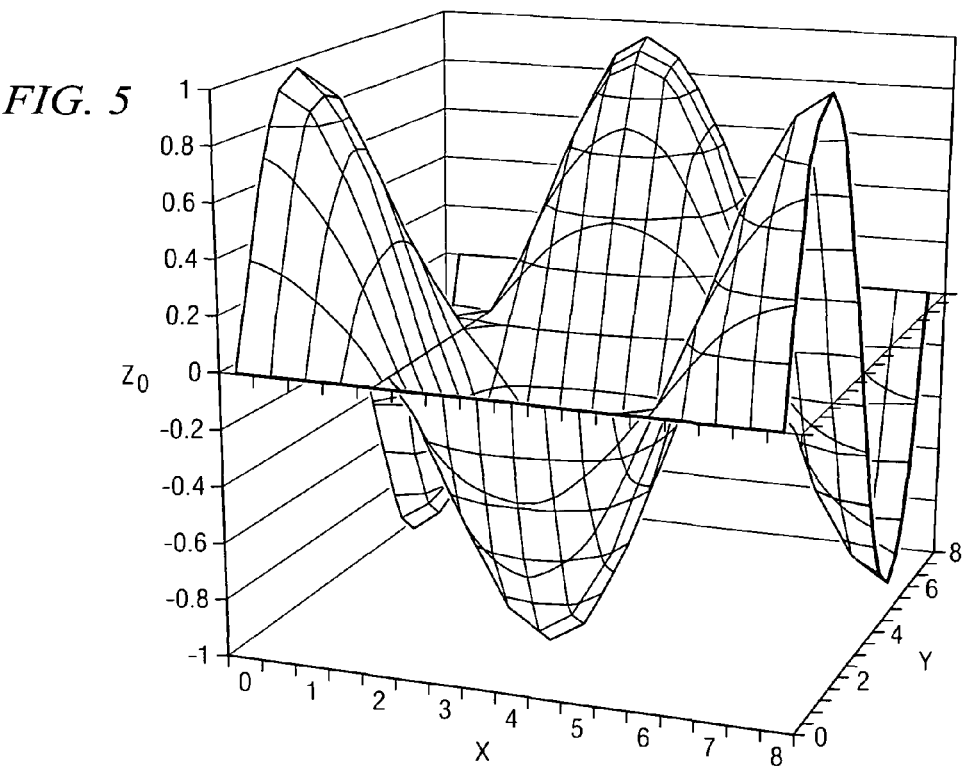
FIG. 5 is a 3-D plot illustrating the effectiveness of weighted pattern learning according to one embodiment of the invention, using a simple example of 2-D function approximation.

FIG. 5 is a 3-D plot illustrating the effectiveness of weighted pattern learning according to one embodiment of the invention, using a simple example of 2-D function approximation. Suppose the function to be approximated is of the following form:

$$z_0 = \sin\left(\frac{\pi x}{4}\right)\cos\left(\frac{\pi y}{4}\right) \quad (15)$$

where x and y are in the interval [0.0, 8.0].

The training set is generated by sampling on a set of grid points. For both x and y coordinates, the grid points are selected with a step of 1 starting from 0. This results in a total of 81 points in the training set. To avoid overtraining, a validation set is also generated similarly, but for both x and y coordinates, the grid points are selected with a step of 1 starting from 0.5. This results in a total of 64 points in the validation set. To simulate different reliability based on signal strength, a noise term of white Gaussian noise modulated by reverse magnitude of the true signal is added to the $z_0$ value. Equation (16) shows the actual function that is sampled to create the data sets for training and validation.

$$z = z_0 + N(0,1)[0.9(1-|z_0|)+0.1] \quad (16)$$

where N(0,1) represent a random value from the standard Gaussian distribution. It can be seen from the above equation that the magnitude of the noise level is comparable to that of the true signal and the noise level is higher when the true signal level is low. With that considered to be a priori knowledge of reliability, the weight for each training pattern is selected using the following formula, $$u^2 = 9|z_0| + 1 \quad (17)$$

The weighted pattern learning approach of method 100 as shown in FIG. 2 as used to build a model of the function shown in Equation (15). The training data set was used to compute the network weights utilizing the pattern level weights. The validation set was not used in determining the network weights but only to stop the training process in time to prevent overtraining. The validation set patterns were not weighted. To test the quality of the resulting model, a third data set, the test set, which contains 1000 samples of original function in Equation (15) at random positions were used to test the model. To show the effectiveness of the weighted pattern learning, the original OFLN approach and back-propagation training using single hidden layer net were also used to build models using the same training and validation sets, and the same test set was also used to characterize the quality of those models.

Table 1 is a table summarizing the results of this exercise. For each model, it shows the degrees of freedom, mean squared error (MSE) and ANOVA $R^2$ values of the training, validation and test sets. Because hidden layer net with back propagation training algorithm cannot automatically determine the number of nodes needed, three different cases were tried with the number of nodes in the single hidden layer to be 3, 10 and 20 and denoted bp-3, bp-10 and bp-20 respectively in the table. The resulting network structure of using the OFLN training method and the new weighted pattern learning in conjunction with OFLN, denoted w-OFLN in the table, are identical except for the use of the linear network weights. From the results of the test set, which represents the original function to be learned, it can be seen the weighted pattern learning approach yields the best results with over 40% reduction in MSE compared with original OFLN approach and around 55% reduction in MSE compared with back propagation on hidden layer net.

TABLE 1

Results for modeling Equation (15)

| | Degrees of Freedom | Training set | | Validation set | | Test set | |
|---|---|---|---|---|---|---|---|
| | | MSE | $R^2$ | MSE | $R^2$ | MSE | $R^2$ |
| w-OFLN | 23 | 0.270298 | 33.3839 | 0.316842 | 21.913 | 0.062018 | 84.7153 |
| OFLN | 23 | 0.24208 | 40.3384 | 0.347504 | 14.3562 | 0.105378 | 74.0291 |
| bp-3 | 12 | 0.135839 | −10.9459 | 0.134032 | 16.2231 | 0.139169 | 65.7012 |
| bp-10 | 40 | 0.132051 | −11.0357 | 0.133586 | 15.797 | 0.13774 | 66.0535 |
| bp-20 | 80 | 0.132255 | −9.45297 | 0.131268 | 15.8726 | 0.134816 | 66.7741 |

Although the present invention and its advantages have been described in detail, it should be understood that various changes, substitutions, and alterations can be made therein without departing from the spirit and scope of the invention as defined by the appended claims.

What is claimed is:
1. A computer system comprising:
a processor; and
a program stored in computer-readable media and executable by the processor, the computer program operable to:

receive a plurality of sets of data, each set representative of a plurality of inputs to a neural net and a resulting at least one output from the neural net;

calculate a plurality of network weights for the neural net based on the received plurality of sets of data, including attributing greater weight in the calculation to at least one set of the plurality of sets of data than at least one other set of the plurality of sets of data; and train the neural net using the calculated plurality of network weights.

2. The computer system of claim 1, wherein the computer program is operable to calculate a plurality of network weights for the neural net by calculating a least squares approximation to a plurality of simultaneous equations based on the plurality of sets of data.

3. The computer system of claim 2, wherein the computer program is operable to attribute a pattern weight to each set of the plurality of sets of data.

4. The computer system of claim 3, wherein the computer program is further operable to attribute greater weight in the calculation of the plurality of network weights to at least one set of the plurality of sets of data by calculating a least squares approximation to the following equations:

$$\begin{bmatrix} u_1 y_1 \\ u_2 y_2 \\ \vdots \\ u_P y_P \end{bmatrix} = y_u = F_u w = \begin{bmatrix} u_1 F_1 \\ u_2 F_2 \\ \vdots \\ u_P F_P \end{bmatrix} w = \begin{bmatrix} u_1 f_1(x_1) & u_1 f_2(x_1) & \cdots & u_1 f_J(x_1) \\ u_2 f_1(x_2) & u_2 f_2(x_2) & \cdots & u_2 f_J(x_2) \\ \vdots & \vdots & \ddots & \vdots \\ u_P f_1(x_P) & u_P f_2(x_P) & \cdots & u_P f_J(x_P) \end{bmatrix} w$$

where w=the plurality of network weights, $x_1$ through $x_p$=the plurality of inputs in the plurality of sets of data, $u_1$ through $u_p$=a plurality of pattern weights each associated with a respective one of the plurality of sets of data, $f_1$ through $f_p$=a plurality of functions, and $y_1$ through $y_p$=the at least one output in the plurality of sets of data.

5. The computer system of claim 4, wherein the computer program is further capable of calculating a least squares approximation by solving the following system of equations $$\sum_p u_p^2 F_p^T y_p = F_u^T y_u = F_u^T F_u w = \left( \sum_p u_p^2 F_p^T F_p \right) w$$

where $[F_u^T y_u]_j = \sum_{p=1}^{P} u_p^2 f_j(x_p) y_p$, where $j = 1, \ldots, J$ and $[F_u^T F_u]_{ij} = \sum_{p=1}^{P} u_p^2 f_i(x_p) f_j(x_p)$, where both $i$ and $j = 1, \ldots, J$.

6. The computer system of claim 3, wherein the computer program is further operable to calculate the pattern weights.

7. The computer system of claim 2, wherein the computer program is further operable to calculate a least squares approximation by calculating an orthogonal least squares approximation.

8. The computer system of claim 1, wherein the computer program is further operable to store the trained neural net.

9. A system comprising:

means for receiving a plurality of sets of data, each set representative of a plurality of inputs to the neural net and a resulting at least one output from the neural net;

means for calculating a plurality of network weights for the neural net based on the received plurality of sets of data, including means for attributing greater weight in the calculation to at least one set of the plurality of sets of data than at least one other set of the plurality of sets of data; and means for training the neural net using the calculated plurality of network weights.

10. The system of claim 9, wherein the means for calculating a plurality of network weights comprises means for calculating a least squares approximation to a plurality of simultaneous equations based on the plurality of sets of data.

11. The system of claim 10, wherein the means for attributing greater weight in the calculation comprises means for attributing a pattern weight to each set of the plurality of sets of data.

12. The system of claim 9, further comprising means for storing the trained neural net.

* * * * *